US010673781B2

(12) United States Patent
Marichetty et al.

(10) Patent No.: US 10,673,781 B2
(45) Date of Patent: Jun. 2, 2020

(54) DEDICATED VIRTUAL LOCAL AREA NETWORK FOR PEER-TO-PEER TRAFFIC TRANSMITTED BETWEEN SWITCHES

(71) Applicant: Hewlett Packard Enterprise Development LP, Houston, TX (US)

(72) Inventors: Venkatesan Marichetty, Santa Clara, CA (US); Isaac Theogaraj, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 81 days.

(21) Appl. No.: 15/884,585

(22) Filed: Jan. 31, 2018

(65) Prior Publication Data
US 2019/0238483 A1    Aug. 1, 2019

(51) Int. Cl.
| | |
|---|---|
| *H04L 12/947* | (2013.01) |
| *H04L 12/741* | (2013.01) |
| *H04L 12/46* | (2006.01) |
| *H04L 29/12* | (2006.01) |
| *H04L 29/08* | (2006.01) |

(52) U.S. Cl.
CPC .......... *H04L 49/25* (2013.01); *H04L 12/4641* (2013.01); *H04L 45/745* (2013.01); *H04L 61/1552* (2013.01); *H04L 61/2015* (2013.01); *H04L 67/104* (2013.01)

(58) Field of Classification Search
CPC . H04L 49/25; H04L 12/4633; H04L 12/4641; H04L 12/4645; H04L 45/745
See application file for complete search history.

(56) References Cited

U.S. PATENT DOCUMENTS

| | | | |
|---|---|---|---|
| 8,194,534 B2 | 6/2012 | Pandey | |
| 8,837,499 B2 | 9/2014 | Leu et al. | |
| 9,391,796 B1 | 7/2016 | Shekhar et al. | |
| 9,544,219 B2 | 1/2017 | Chong et al. | |
| 2007/0237148 A1 | 10/2007 | Jabr et al. | |
| 2013/0124750 A1 | 5/2013 | Anumala et al. | |
| 2014/0211607 A1* | 7/2014 | Li | H04L 49/552 370/219 |
| 2014/0269648 A1 | 9/2014 | Unnimadhavan et al. | |

(Continued)

FOREIGN PATENT DOCUMENTS

WO    2004/032426 A1    4/2004

OTHER PUBLICATIONS

Campus 3.0 Virtual Switching System Design Guide, (Research Paper), Dec. 10, 2013, 46 Pgs.

(Continued)

*Primary Examiner* — Marcus Smith
(74) *Attorney, Agent, or Firm* — Hewlett Packard Enterprise Patent Development (57) ABSTRACT

Example method includes: defining, by a network device, a source virtual local area network (VLAN), wherein the source VLAN is common for at least a first switch and a second switch, and wherein the source VLAN is dedicated to a particular link between the first switch and the second switch; and using an Internet Protocol (IP) address corresponding to the defined source VLAN as a source address for peer-to-peer traffic transmitted between the first switch and the second switch, wherein no peer-to-peer traffic between the first switch and the second switch is transmitted over a link other than the particular link.

13 Claims, 4 Drawing Sheets

(56) References Cited

U.S. PATENT DOCUMENTS

| | | |
|---|---|---|
| 2015/0188722 A1* | 7/2015 | Bhagavathiperumal ..................... H04L 12/1886 370/235 |
| 2015/0271017 A1* | 9/2015 | Seligson ............. H04L 41/0813 370/254 |
| 2016/0094442 A1* | 3/2016 | Arumugam ............. H04L 12/18 370/220 |
| 2016/0261496 A1* | 9/2016 | Chang ................. H04L 12/4633 |
| 2017/0026283 A1* | 1/2017 | Williams ................ H04L 45/64 |
| 2017/0237655 A1* | 8/2017 | Yang ................... H04L 12/4633 370/254 |
| 2017/0346686 A1* | 11/2017 | Mudigonda ......... H04L 41/0806 |
| 2019/0132241 A1* | 5/2019 | Vattem ................ H04L 12/4633 |

OTHER PUBLICATIONS

Network Fundamentals, (Research Paper), Apr. 2005, 6Pgs.
European Search Report and Search Opinion Received for EP Application No. 19152849.6, dated May 9, 2019, 7 pages.

* cited by examiner

DEDICATED VIRTUAL LOCAL AREA NETWORK FOR PEER-TO-PEER TRAFFIC TRANSMITTED BETWEEN SWITCHES

BACKGROUND

A software-defined networking in a wide area network (SD-WAN) may simplify management and operation of a wide area network (WAN) by separating the networking hardware from its control mechanism. SD-WAN allows enterprises to build high-performance WANs using lower-cost network access replacing private WAN connection technologies such as multiprotocol label switching (MPLS). Gateway controllers can be deployed at the branch offices in a SD-WAN solution. Redundancy of gateway peers are usually provided so that the gateway branch controllers can be highly available. Also, traffic can be load balanced across the redundant gateway peers.

BRIEF DESCRIPTION OF THE DRAWINGS

The following detailed description references the drawings, wherein.

DETAILED DESCRIPTION

An example SD-WAN branch deployment may include a plurality of branch gateway controller peers that are highly available to provide redundancies for the gateway peers. The branch gateway peers can provide uplink connectivity, traffic load balancing, policy-based routing, etc. In addition, traffic load are balanced among at least two branch gateway peers. To provide redundancy for each other, these two branch gateway peers may be connected through a network switch. In some embodiments, they can operate in an active-active model to service branch wireless and wired clients. For example, in an active-active model, about half of the client devices in the network may terminate on a first branch gateway peer, and the other half of the network client devices in the network may terminate on a second branch gateway peer. Each gateway peer may be connected with an access point.

Although peer-to-peer traffic could be routed through in an alternative path via a layer-2 switch, a direct peer-to-peer link may be used for one-to-one communications across the branch gateway controller peers. Peer-to-peer traffic can be enforced to pass through the direct link between the branch gateway controller peers in order to achieve better throughput, efficiency, and prioritization.

Figure 1:
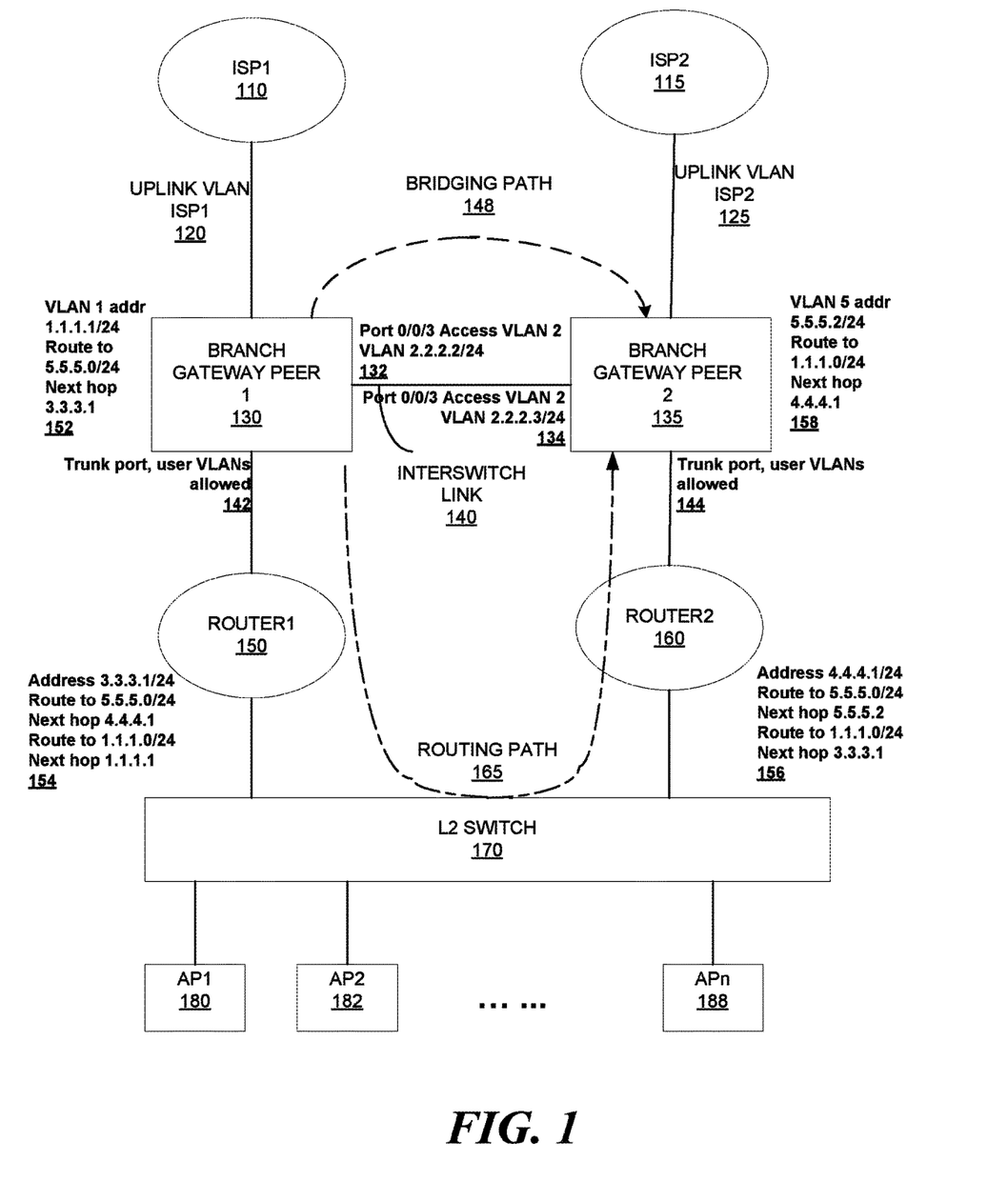
FIG. 1 is a block diagram of an example system deployment for dedicated virtual local area network for peer-to-peer traffic transmitted between switches.

FIG. 1 is a block diagram of an example system deployment for dedicated virtual local area network for peer-to-peer traffic transmitted between switches. FIG. 1 includes two branch gateway peers, such as, branch gateway peer 1 130 and branch gateway peer 2 135. Although two branch gateway peers are illustrated here, an example branch deployment may have more than two branch gateway peers.

Each branch gateway peer (130 or 135) has an uplink connection that may connect to an Internet Service Provider (ISP). In this example, branch gateway peer 1 130 is connected to ISP1 110, and branch gateway peer 2 135 is connected to ISP2 115. An ISP generally refers to an entity that provides enterprises or individual users with access to the Internet and other related services. The ISP has the equipment and the telecommunication line access required to have a point-of-presence on the Internet for the geographic area served.

Also, branch gateway peers 130 and 135 can manage a plurality of client devices through a plurality of access points (e.g., AP1 180, AP2 182, . . . APn 188) deployed in the example branch network. The plurality of APs 180-188 may be connected to ports of at least one Layer-2 switch in the network switch via wired connections.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. For example, a "network device may refer to a network controller that comprises a hardware or a combination of hardware and software that enables connection between client devices and computer networks. In some implementations, a network device may refer to a server computing device (e.g., on-premise server, private, public, or hybrid cloud server) that comprises a hardware or a combination of hardware and software that can process and/or display network-related information. In some implementations, a network device may refer to an access point acting as a virtual master network controller among a cluster of access points.

As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

Branch gateway peer 1 130 and branch gateway peer 135 provides redundancy for each other. In some examples, one half of the clients in the network are managed by branch gateway peer 1 130, while the other half of the clients in the network are managed by branch gateway peer 2 135. In the event that branch gateway peer 1 fails, branch gateway peer 2 135, as the backup peer, would manage the half of the clients previously managed by branch gateway peer 1 130, and vice versa.

Furthermore, traffic between ISP1 110 and branch gateway peer 1 130 are transmitted on uplink virtual local area network (VLAN) 120 associated with ISP1 110. On the other hand, traffic between ISP2 115 and branch gateway peer 2 135 are transmitted on uplink VLAN 125 associated with ISP2 115. As used herein, a VLAN may generally refer to a logical group of workstations, servers and network devices that appear to be on the same LAN despite their geographical distribution. A VLAN can allow a network of computers and users to communicate in a simulated environment as if they exist in a single LAN and are sharing a single broadcast and multicast domain. VLANs are implemented to achieve scalability, security and ease of network management and can quickly adapt to changes in network requirements and relocation of workstations and server nodes. In FIG. 1, configuration 152 shows an example configuration for uplink VLAN 120. In this example, VLAN 1 120 has an address space of 1.1.1.1/24. In one example, VLAN 1 120 may be a VLAN dedicated to transmit traffic to and from devices associated with employees of an organization. Also, configuration 158 shows an example configuration for uplink VLAN 125. In this example, VLAN 5 125 has an address space of 5.5.5.2/24. In one example, VLAN 5 125 may be a VLAN dedicated to transmit traffic to and from devices associated with guests of the organization.

In this branch deployment, there can be both a routing path 165 and a bridging path 148 that are established between branch gateway peer 1 130 and branch gateway peer 2 135 for peer-to-peer traffics. Specifically, routing path 165 can be used to transmit traffic between branch gateway peers 130 and 135 via router 1 150, at least one Layer-2 switch 170, and router 2 160. Here, router 1 150 is connected to a trunk port 142 of branch gateway peer 1 130 where user VLANs are allowed. Similarly, router 2 160 is connected to a trunk port 144 of branch gateway peer 2 135 where user VLANs are allowed. Trunk ports 142 and 144 generally refer to ports of a switch that are configured to carry traffic that belongs to multiple VLANs over the same link. As used herein, "user VLANs" may generally refer to VLANs that are dedicated for traffic to and from a group of client devices in the network. This is in contrast to "management VLANs," which may be used to transmit management and/or control frames among network management devices in a network, e.g., between wireless controllers and access points, etc. In this example, router 1 150 is configured with VLAN address 3.3.3.1/24 and router 2 160 is configured with VLAN address 4.4.4.1/24.

In some examples, the system may be configured with policy-based routing schemes. For instance, a policy may state that traffic to or from client devices associated with employees of the organization is transmitted through branch gateway peer 1 130. However, if a client device associated with an employee has been authenticated into the network, then traffic to and from the authenticated client device may be transmitted through branch gateway peer 2 135.

In some examples, the system may inspect the traffic to determine whether the traffic belongs to a high priority. If the system determines that the traffic belongs to the high priority, the traffic is transmitted through branch gateway peer 1 130. However, if the system determines that the traffic does not belong to a high priority, then the traffic is transmitted through branch gateway peer 2 135.

As shown in the above examples, the traffic often needs to be transmitted between branch gateway peer 1 130 and branch gateway peer 2 135. In some examples, peer-to-peer traffic can be routed via routing path 165 from branch gateway peer 1 130 to or from branch gateway peer 2 135 at the address of 5.5.5.0/24 with a next hop address of 3.3.3.1. Note that router 1 150 can route the peer-to-peer traffic in two directions. For example, for traffic to branch gateway peer 2 135, router 1 150 can route it to VLAN 5.5.5.0/24 with next hop address of 4.4 0.4.1, which corresponds to the IP address of router 2 160; for traffic to branch gateway peer 1 130, router 1 150 can route it to VLAN 1.1.1.0/24 with next hop address of 1.1.1.1, which corresponds to the IP address of branch gateway peer 1 130. Similarly, router 2 160 can route the peer-to-peer traffic in two directions. For traffic to branch gateway peer 2 135, router 2 160 can route it to VLAN 5.5.5.0/24 with next hop address of 5.5.5.2, which corresponds to the IP address of branch gateway peer 2 135; for traffic to branch gateway peer 1 130, router 2 160 can route it to VLAN 1.1.1.0/24 with next hop address of 3.3.3.1, which corresponds to the IP address of router 1 150. The IP addresses and next hop addresses mentioned above can be stored in a routing table at router 1 150 and router 2 160.

On the other hand, traffic between branch gateway peer 1 130 and branch gateway peer 2 135 can also be transmitted without routing through bridging path 148. Specifically, the peer-to-peer traffic can be transmitted via a dedicated interswitch link 140. Because Interswitch link 140 here is dedicated for the peer-to-peer traffic, it allows traffic to be transmitted with low latency and high bandwidth. In FIG. 1, interswitch link 140 directly connects port 132 of branch gateway peer 1 130 and port 134 of branch gateway peer 2 135.

Figure 2:
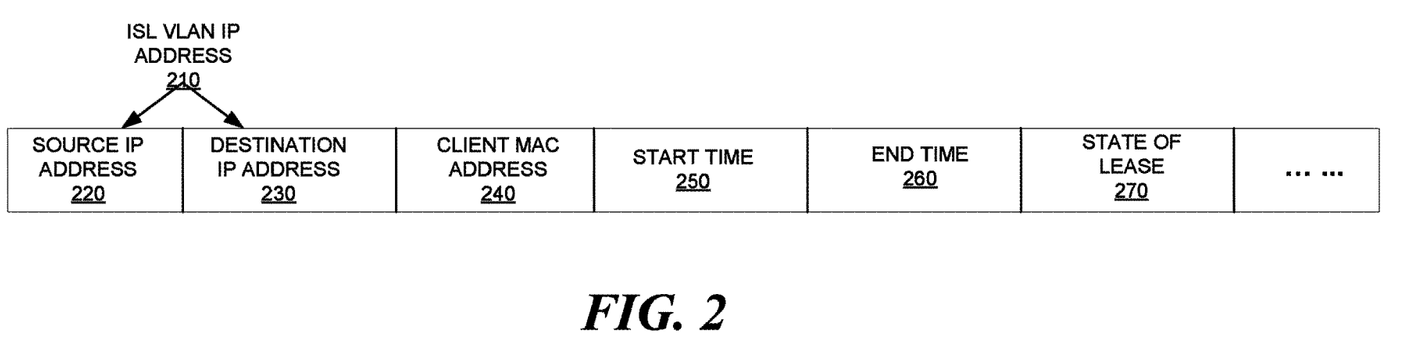
FIG. 2 is a block diagram illustrating an example peer-to-peer traffic packet transmitted between switches on a dedicated virtual local area network.

Even though there are two alternative paths, e.g., a routing path 165 and a switching path 148, for transmitting peer-to-peer traffic between the two branch gateway peers, transmitting the peer-to-peer traffic exclusively on switching path 148 results in lower latency and higher throughput than on routing path 165 exclusively or using both paths. In order to transmit peer-to-peer traffic exclusively on bridging path 148, examples of the present disclosure use specific configurations on branch gateway peers. A particular VLAN (e.g., VLAN 2) is the single VLAN configured on both access port 132 and access port 134 and dedicated for peer-to-peer traffic between branch gateway peer 1 130 and branch gateway peer 2 135. Unlike a trunk port, an access port allows traffic with a specific VLAN identifier to pass through and blocks all other traffics, including untagged traffic and traffic with other VLAN identifiers. As a result, when network traffic is sourced from VLAN 2 and destined to VLAN 2, it is transmitted over bridging path 148. In the example illustrated in FIG. 1, the peer-to-peer packets are sourced from the IP address of 2.2.2.2 and destined to the IP address of 2.2.2.3. Note that, here, the subnet 2.2.2.2/24 or 2.2.2.3/24 each is a connected interface. Also, the single VLAN (e.g., VLAN2) using the same subnet is configured on access port 0/0/3 of both branch gateway peers that terminates interswitch link 140. Such configuration can ensure that the peer-to-peer traffic is transmitted through bridging path 148, straight into the interswitch link port 0/0/3, and at the same time, avoid transmitting peer-to-peer traffic through routing path 165. In other words, no peer-to-peer traffic is transmitted through routing path 165 with the configuration disclosed herein. The exclusive transmission of peer-to-peer traffic on switching path 148 can provide low latency and high throughput FIG. 2 is a block diagram illustrating an example peer-to-peer traffic packet transmitted between switches on a dedicated virtual local area network. Note that certain headers may be added to a peer-to-peer packet to ensure that the packet is transmitted through the bridging path and not the routing path when both paths are available in the network. Specifically, the example peer-to-peer traffic packet may include inter-switch link VLAN IP addresses 210, a client Media Access Control (MAC) address 240, a start time 250, an end time 260, a state of lease 270, etc. Further, inter-switch VLAN IP addresses 210 may include a source IP address 220 indicating the IP address of the source from which the peer-to-peer packet is transmitted, and a destination IP address 230 indicating the IP address of the destination to which the peer-to-peer packet is transmitted. As discussed above, for peer-to-peer traffic, a branch gateway peer may use a specific set of headers, including but not limited to source IP address 220 and destination IP address 230, to the peer-to-peer packet. The source IP address 220 and the destination IP address 230 belong to the same VLAN (e.g., VLAN 2) that is dedicated to the peer-to-peer traffic between the two branch gateway peers.

Client MAC address 240 may uniquely identify a client device that the packet corresponds to. Start time 250 may indicate a dynamic host configuration protocol (DHCP) lease start time corresponding to the client device with the MAC address 240. End time 260 may indicate a DHCP lease end time corresponding to the client device.

The dedicated VLAN over the interswitch link can be used in other scenarios too. In some examples, high throughput device-to-device communications can be transmitted over the dedicated VLAN over the interswitch link. Such device-to-device communication may include high availability control data, for example, data about sessions, routes, client states, etc. The device-to-device communication may also include data traffic that are redirected from device to device for multiple reasons, including but not limited to, load balancing, redirect policies, etc.

In some examples, a database sync module (e.g., dbsync) may use the dedicated VLAN over the interswitch link to communicate information, such as, white list database, authentication details, etc.

In some examples, the dedicated VLAN over the interswitch link described herein can communicate information among network controllers in a controller cluster. For examples, the network controllers within the same controller cluster may communicate with each other client state synchronization information, which may include but is not limited to, authentication keys, role, access control list (ACL) information, WLAN protocol transmit/receive (Tx/Rx) counters etc.

In some examples, the dedicated VLAN over the interswitch link can be used to transmit firewall visibility data across redundant gateway devices to handle failover. In addition, the dedicated VLAN over the interswitch link can also be used to synchronize route table, forwarding rules, and/or other high availability data-plane or control-plane data.

Figure 3:
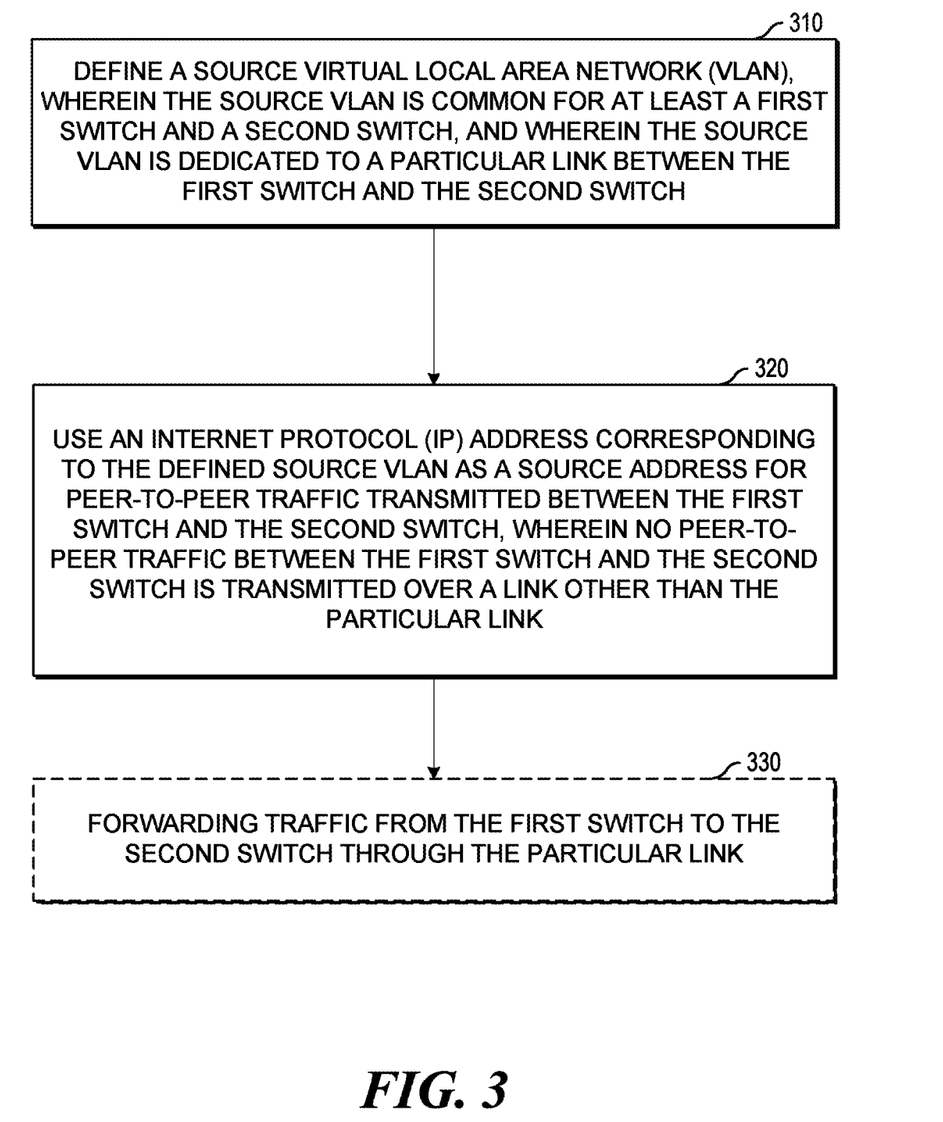
FIG. 3 is a flowchart of an example process of providing dedicated virtual local area network for peer-to-peer traffic transmitted between switches.

Processes of Providing Dedicated Virtual Local Area Network for Peer-to-Peer Traffic Transmitted Between Switches FIG. 3 is a flowchart of an example process of providing dedicated virtual local area network for peer-to-peer traffic transmitted between switches. During operations, a network device (such as, the branch gateway controller) can define a source virtual local area network (VLAN), wherein the source VLAN is common for at least a first switch and a second switch, and wherein the source VLAN is dedicated to a particular link between the first switch and the second switch (operation 310). Furthermore, the network device can use an Internet Protocol (IP) address corresponding to the defined source VLAN as a source address for peer-to-peer traffic transmitted between the first switch and the second switch, wherein no peer-to-peer traffic between the first switch and the second switch is transmitted over a link other than the particular link (operation 320).

In some examples, the source VLAN can be locally connected. In some examples, a first single port of the first switch can be attached to the source VLAN. Also, a second single port of the second switch can be attached to the source VLAN.

In some examples, the network device can divert traffic through the particular link to be routed upstream via the peer uplink based on a plurality of network policies.

In some examples, the network device can synchronize dynamic host configuration protocol (DHCP) leases corresponding to client devices served by the first switch and the second switch in response to a DHCP failure.

In some examples, the network device can forward traffic from the first switch to the second switch through the particular link. Here, a first load on the first switch may be high, and a second load on the second switch may be low.

Figure 4:
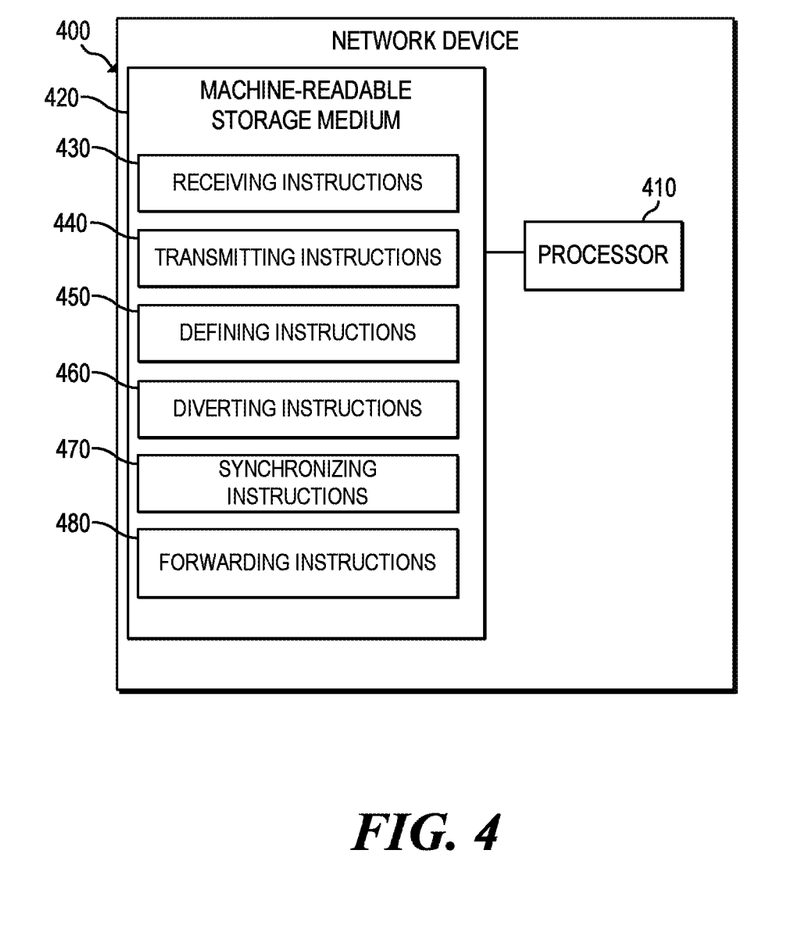
FIG. 4 is a block diagram of an example network device to provide dedicated virtual local area network for peer-to-peer traffic transmitted between switches.

Network Device to Provide Dedicated Virtual Local Area Network for Peer-to-Peer Traffic Transmitted Between Switches FIG. 4 is a block diagram of an example network device to provide dedicated virtual local area network for peer-to-peer traffic transmitted between switches.

As used herein, a network device may be implemented, at least in part, by a combination of hardware and programming. For example, the hardware may comprise at least one processor (e.g., processor 410) and the programming may comprise instructions, executable by the processor(s), stored on at least one machine-readable storage medium (e.g., 420). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 410 may fetch, decode, and execute instructions stored on storage medium 420 to perform the functionalities described below in relation to receiving instructions 430, transmitting instructions 440, defining instructions 450, diverting instructions 460, synchronizing instructions 470, and forwarding instructions 480. In other examples, the functionalities of any of the instructions of storage medium 420 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 4, storage medium 420 may be implemented by one machine-readable storage medium, or multiple machine-readable storage media.

Although network device 400 includes at least one processor 410 and machine-readable storage medium 420, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 430-480 may be executed by processor 410 to: defining a source virtual local area network (VLAN), wherein the source VLAN is common for at least a first switch and a second switch, and wherein the source VLAN is dedicated to a particular link between the first switch and the second switch; using an Internet Protocol (IP) address corresponding to the defined source VLAN as a source address for peer-to-peer traffic transmitted between the first switch and the second switch, wherein no peer-to-peer traffic between the first switch and the second switch is transmitted over a link other than the particular link; diverting traffic through the particular link to be routed upstream via the peer uplink based on a plurality of network policies; synchronizing dynamic host configuration protocol (DHCP) leases corresponding to client devices served by the first switch and the second switch in response to a DHCP failure; forwarding traffic from the first switch to the second switch through the particular link, wherein a first load on the first switch is high, and wherein a second load on the second switch is low; etc.

We claim:

1. A method comprising:
   defining, by a network device, a source virtual local area network (VLAN), wherein the source VLAN is common for at least a first switch and a second switch, wherein the source VLAN is dedicated to an inter-switch link between a first access port of the first switch and a second access port of the second switch, wherein the source VLAN is the only VLAN configured on the first access port and on the second access port, wherein the first access port and the second access port are defined to allow traffic only for the source VLAN, and wherein a separate routing path is also present between the first switch and the second switch;
   using an Internet Protocol (IP) address corresponding to the defined source VLAN as a source address and a destination address for all peer-to-peer traffic transmitted between the first switch and the second switch, wherein peer-to-peer traffic between the first switch and the second switch is prevented from being transmitted over a link other than the dedicated inter-switch link, wherein the first switch comprises a first branch gateway peer connected to a first ISP (Internet Service Provider) ISP and the second switch comprises a second branch gateway peer connected to a second ISP; and
   forwarding traffic from the first switch to the second switch through the dedicated inter-switch link, wherein a first load on the first switch is high, and wherein a second load on the second switch is low.

2. The method of claim 1, wherein the source VLAN is locally connected to the first switch and the second switch.

3. The method of claim 1, wherein the routing path comprises a path via at least a first router, an Layer-2 (L2) switch, and a second router.

4. The method of claim 1, further comprising:
   diverting traffic through the dedicated inter-switch link to be routed upstream via an uplink connection from the first switch based on a plurality of network policies.

5. The method of claim 1, further comprising:
   synchronizing via the dedicated inter-switch link dynamic host configuration protocol (DHCP) leases corresponding to client devices served by the first switch and the second switch in response to a DHCP failure.

6. A network device, comprising at least:
   a memory;
   a first switch;
   a processor executing instructions from the memory to:
   define a source virtual local area network (VLAN), wherein the source VLAN is common for at least the first switch and a second switch, and wherein the source VLAN is dedicated to an inter-switch link between a first access port of the first switch and a second access port of the second switch, wherein the source VLAN is the only VLAN configured on the first access port and on the second access port, wherein the first access port and the second access port are defined to allow traffic only for the source VLAN, and wherein a separate routing path is also present between the first switch and the second switch;
   use an Internet Protocol (IP) address corresponding to the defined source VLAN as a source address and a destination address for all peer-to-peer traffic transmitted between the first switch and the second switch, wherein peer-to-peer traffic between the first switch and the second switch is prevented from being transmitted over a link other than the dedicated inter-switch link, wherein the first switch comprises a first branch gateway peer connected to a first ISP (Internet Service Provider) ISP and the second switch comprises a second branch gateway peer connected to a second ISP;
   forward traffic from the first switch to the second switch through the dedicated inter-switch link, wherein a first load on the first switch is high, and wherein a second load on the second switch is low.

7. The network device of claim 6, wherein the source VLAN is locally connected to the first switch and the second switch.

8. The network device of claim 6, wherein the processor further executes the instructions from the memory to:
   divert traffic through the dedicated inter-switch link to be routed upstream via an uplink connection from the first switch based on a plurality of network policies.

9. The network device of claim 6, wherein the processor further executes the instructions from the memory to:
   synchronize via the dedicated inter-switch link dynamic host configuration protocol (DHCP) leases corresponding to client devices served by the first switch and the second switch in response to a DHCP failure.

10. A non-transitory machine-readable storage medium encoded with instructions executable by at least one processor of a network device, the machine-readable storage medium comprising instructions to:
    define a source virtual local area network (VLAN), wherein the source VLAN is common for at least a first switch and a second switch, wherein the source VLAN is dedicated to an inter-switch link between a first access port of the first switch and a second access port of the second switch, wherein the source VLAN is the only VLAN configured on the first access port and on the second access port, wherein the first access port and the second access port are defined to allow traffic only for the source VLAN, and wherein a separate routing path is also present between the first switch and the second switch; and
    use an Internet Protocol (IP) address corresponding to the defined source VLAN as a source address and a destination address for all peer-to-peer traffic transmitted between the first switch and the second switch, wherein peer-to-peer traffic between the first switch and the second switch is prevented from being transmitted over a link other than the dedicated inter-switch link, wherein the first switch comprises a first branch gateway peer connected to a first ISP (Internet Service Provider) ISP and the second switch comprises a second branch gateway peer connected to a second ISP;

forward traffic from the first switch to the second switch through the dedicated inter-switch link, wherein a first load on the first switch is high, and wherein a second load on the second switch is low.

11. The non-transitory machine-readable storage medium of claim 10, wherein the source VLAN is locally connected to the first switch and the second switch.

12. The non-transitory machine-readable storage medium of claim 10, wherein the machine-readable storage medium further comprises instructions to:

divert traffic through the dedicated inter-switch link to be routed upstream via an uplink connection from the first switch based on a plurality of network policies.

13. The non-transitory machine-readable storage medium of claim 10, wherein the machine-readable storage medium further comprises instructions to:

synchronize via the dedicated inter-switch link dynamic host configuration protocol (DHCP) leases corresponding to client devices served by the first switch and the second switch in response to a DHCP failure.

\* \* \* \* \*